United States Patent [19]

Nunlist

[11] Patent Number: 4,796,344
[45] Date of Patent: Jan. 10, 1989

[54] METHOD FOR AVOIDING THERMAL STRESSES IN GLASS LINED VESSELS

[75] Inventor: Erwin J. Nunlist, Penfield, N.Y.

[73] Assignee: The Pfaudler Companies, Inc., Rochester, N.Y.

[21] Appl. No.: 102,381

[22] Filed: Sep. 29, 1987

Related U.S. Application Data

[62] Division of Ser. No. 668,604, Nov. 5, 1984, Pat. No. 4,711,296.

[51] Int. Cl.$^4$ ............................................. B21D 53/00
[52] U.S. Cl. ................................. 29/157 R; 165/169; 220/68; 220/428
[58] Field of Search .............. 29/157 R; 165/47, 169, 165/108; 220/1 B, 68, 457, 426, 428, 459

[56] References Cited

U.S. PATENT DOCUMENTS

| | | |
|---|---|---|
| 1,343,169 | 6/1920 | Douglass . |
| 1,689,917 | 10/1928 | Geisinger . |
| 2,198,315 | 4/1940 | Nyberg ................................. 220/15 |
| 2,391,876 | 1/1946 | Brown ................................. 257/212 |
| 2,526,165 | 10/1950 | Smith ................................... 62/1 |
| 2,812,643 | 11/1957 | Worschitz ........................... 62/104 |
| 3,062,685 | 11/1962 | Sanford et al. ..................... 117/129 |
| 3,282,459 | 11/1966 | Wilson ................................. 220/3 |
| 3,425,582 | 2/1969 | Nunlist et al. ...................... 220/14 |
| 4,140,073 | 2/1979 | Androulakis ..................... 114/74 A |
| 4,473,171 | 9/1984 | Nunlist ............................... 220/465 |

FOREIGN PATENT DOCUMENTS 110989 7/1961 Pakistan ............................. 206/426

Primary Examiner—P. W. Echols
Assistant Examiner—Irene Cuda
Attorney, Agent, or Firm—Donald C. Studley; Howard M. Ellis; Michael L. Dunn

[57] ABSTRACT

The present invention minimizes the problem of thermal stresses in a glass lined vessel by providing a heat transfer sump in the bottom portion of the vessel. A heat transfer compartment is formed by enclosing the annular space between the exterior portion of the skirt and the bottom portion of the vessel by means of an annular ring. The heat transfer compartment is enclosed by the annular ring, the interior portion of the skirt, and the bottom portion of the vessel. The heat transfer compartment is adapted to receive and hold a heat transfer medium and in this manner form a heat transfer sump.

6 Claims, 1 Drawing Sheet

METHOD FOR AVOIDING THERMAL STRESSES IN GLASS LINED VESSELS

This is a division of application Ser. No. 668,604, filed Nov. 5, 1984, now U.S. Pat. No. 4,711,296.

BACKGROUND AND PRIOR ART

The present invention relates to a method and apparatus for relieving thermal stresses caused by temperature changes in glass lined metal vessels.

Glass, or enamel, internally coated tanks and process equipment have been in wide industrial use for many years where smooth, corrosion resistant, internal surfaces are desired or required. Such equipment is particularly adapted to use in extraction, separation and distillation processes in various chemical, food, and beverage processing industries, where it is in extensive use as reactors, tanks and many types of storage, aging and mixing equipment.

The contour of pressure vessels is generally rounded with ellipsoidal or hemispherical ends to provide better stress distribution. In glass lined vessels the rounded shape also acts to minimize thermal stresses which develop between the glass lining and the metal substrate during temperature changes. Additionally, a rounded internal contour allows the vessel to be easily emptied, cleaned or flushed. Thus, glass lined vessels typically are cylindrical with rounded tops and bottoms. When such vessels are installed in a standing or vertical position, structural support such as legs or a support skirt are required. A skirt is an annular projection that typically extends downward from the side or bottom portion of the vessel beyond the bottom contour and has sufficient dimensional stability to support the vessel in a vertical position.

Glass lined vessels supported by skirts are frequently subject to failure at the bottom knuckle radius of the vessel when the vessel is heated or cooled. The knuckle radius, or transition knuckle, is the area of the vessel adjacent the junction of the contoured, usually spherical or ellipsoidal, bottom and the cylindrical sidewall. Temperature changes from ambient occur when the vessel itself is heated or cooled, or when hot or cold material is introduced into the vessesl. For example, when the vessel is heated, or when heated materials are added to the vessel, the vessel diameter expands. The skirt, especially the bottom portion, (the portion most remote from the vessel), remains at ambient temperature for some time and then slowly warms, but only to a temperature substantially below that of the vessel. Thus, the skirt introduces a bending moment in a knuckle area of the vessel caused by the relative movements of the skirt and vessel wall. This moment when superimposed upon other thermal or mechanically induced stresses on the vessel may be of sufficient magnitude to cause failure of the vessel lining. Correspondingly, a bending moment in the same area is created when the vessel is cooled, or cooled materials are added to the vessel. In such case, the vessel wall contracts while the skirt tends to remain in a relatively expanded state.

The present invention seeks to substantially reduce thermally induced strains in the knuckle radius area of a vessel when the vessel undergoes a temperature change.

BRIEF DESCRIPTION OF THE INVENTION

It is well known to utilize a skirt to support a glass lined vessel in a vertical position. Temperature changes within the vessel create a bending moment along the area of attachment of the support skirt and the vessel wall. Thus for example, when heat is applied to such vessels expansion occurs. The skirt portion is heated through contact with the vessel at the point of attachment. The heat in the skirt rapidly dissipates a short distance from the point of attachment because the skirt acts as a cooling fin. The cooler portion of the skirt remote from the vessel tends to maintain its size while the warm uppermost portion adjacent the vessel expands and attempts to increase in diameter. At a temperature differential of 200° F. the diameter on an eight-foot steel skirt increases about $\frac{1}{8}$ inch. In this manner, bending stresses are produced in the skirt which, in turn, are transmitted to the point of attachment of the skirt on the vessel wall. The resultant bending moment causes failure of the internal coated surface. In a like manner, cooling of the vessel causes stresses in the skirt portion and in the area of junction with the vessel wall.

The present invention minimizes the problem of thermal stresses by providing a thermal transfer sump in the bottom portion of the vessel. A heat transfer compartment is formed by enclosing the annular space between the interior portion of the skirt and the exterior bottom portion of the vessel by means of a hollow annular disc. Thus, the heat transfer compartment is enclosed by the annular disc, the interior portion of the skirt, and the bottom portion of the vessel. The heat transfer compartment is adapted to receive and hold a heat transfer medium and in this manner form a heat transfer sump. Water suitably may be used as the heat transfer medium. More preferred, however, are those fluids used in the art in high temperature heat transfer systems, for example, "Therminol" (marketed by Monsanto Chemical Company) or "Dowtherm" (marketed by Dow Chemical Corp.). The heat transfer medium may be in the form of a fluid and may be circulated through the heat transfer compartment, or, as more preferred, the heat transfer medium may be placid, that is, it remains stationary, and may even be sealed in the heat transfer compartment. High viscosity fluids or mastics, with good heat transfer properties, typically those containing a large amount of graphite, may also be used as the heat transfer medium.

The present invention relates to vertically arranged, cylindrically shaped, glass lined, vessels having side and end walls and a skirt in the lower portion of one of the end walls. A heat transfer compartment, is formed by enclosing the annular space between the skirt interior and the bottom portion of the vessel. The compartment is filled at least partially with a heat transfer medium to form a heat transfer sump. The heat transfer sump places the bottom portion of the vessel in heat transfer relation to the skirt.

The present invention provides a method of minimizing stresses in vertically arranged, cylindrical metal vessels which are subject to heating or cooling by forming a heat transfer compartment, adjacent the lower portion of the vessel. The heat transfer compartment is suitably formed by the interior portion of a support skirt, the exterior bottom of the vessel, and a hollow annular disc or plate. Preferably, the compartment is liquid tight. The compartment is at least partially filled with a heat transfer medium to form a heat transfer sump. Heat or cold from the bottom portion of the vessel is transferred to the sump, which, in turn transfers heat or cold to the skirt, thereby minimizing bending stresses in the vessel wall along the area of attachment of the skirt created by a temperature difference between the skirt and the vessel.

DETAILED DESCRIPTION AND PREFERRED EMBODIMENT OF THE INVENTION

The invention will now be described in detail by reference to the attached drawings in which similar components are represented by similar numbers.

Figure 1:
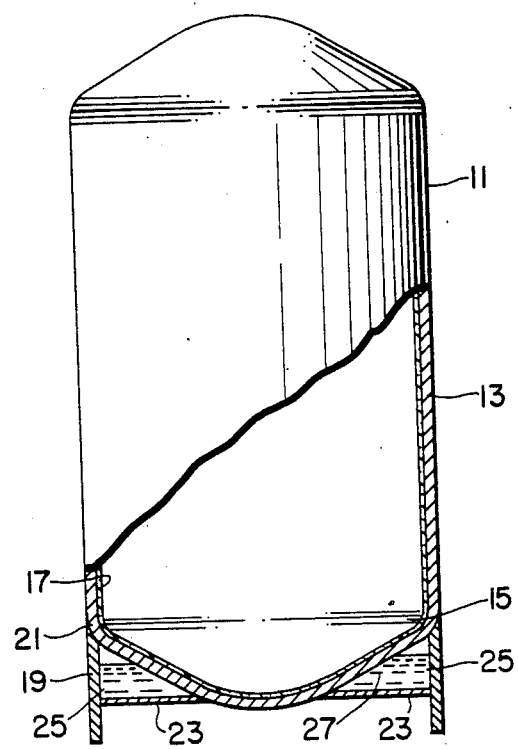
FIG. 1 is a front elevation view partly in cross section showing a typical glass lined vessel equipped with the present heat transfer chamber.

Looking now at FIG. 1 in detail, glass lined vessel 11 has a side wall 13 and a bottom portion 15. Vessel 11 is typically fabricated of a ferrous metal, such as steel. The interior of the vessel has glass lining 17. A support skirt 19 is attached to the bottom portion 15 contiguous to knuckle radius 21 of tank 11. Support skirt 19 is generally aligned with the side wall of vessel 11. Bottom plate 23 encloses chamber 25, formed by the interior surface of skirt 19 the exterior surface of bottom portion 15 and the interior surface of bottom plate 23. Chamber 25 contains a supply of heat transfer medium 27.

Figure 2:
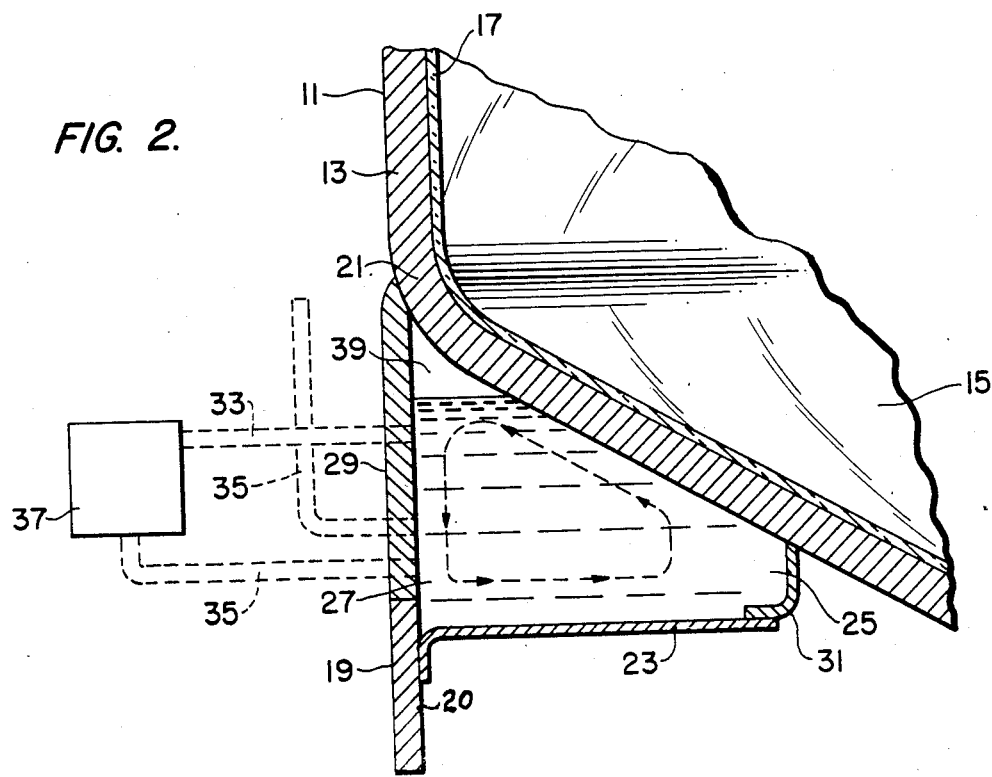
FIG. 2 is an enlargement of a portion of the vessel of FIG. 1 showing a preferred embodiment of the heat transfer sump and the direction of convective circulation through the sump if the vessel were heated. It is to be noted that the convective flow would also be present if the vessel were cooled, however, the direction of flow would be in the opposite direction.

FIG. 2 illustrates in more detail chamber 25 and a preferred embodiment of chamber 25. The dashed lines indicate the convective current through the heat transfer medium, during heat-up of the vessel. FIG. 2 also illustrates a preferred method of forming the heat transfer chamber 25. Prior to applying the internal glass lining 17, a portion of support skirt 19 extending from vessel 11, shown as mini skirt 29, is welded thereto. Ring 31 is also welded to vessel 11 prior to the glassing operation. Mini skirt 29 and ring 31 are attached to vessel 11 at that time in order that direct welding to vessel 11 is not done after glass lining 17 is placed therein. Mini skirt 29 may suitably be lengthened by an extension, such as 20, to obtain a support skirt of a desired length. Chamber 25 contains a supply of heat transfer medium 27 which, if in the form of a liquid, may be circulated therethrough by means of lines such as 33 and 35 (shown in dashed lines) and pump 37. If desired, compartment 25 containing heat transfer medium 27 may be sealed and in such instances an expansion space such as 39 is suitably left in compartment 25.

It is preferred that chamber 25 not be enclosed prior to applying glass lining 17 as the glassing application operation requires an even distribution of heat over the entire surface to be glassed, and this would be made difficult if compartment 25 were enclosed.

In an alternative embodiment, chamber 25 may have a stand pipe such as 35 (shown in dashed lines) to receive the expanding heat transfer fluid from chamber 25 as vessel 11 is heated.

It will be understood that the present invention is equally suited to use in heating or cooling vessels and is not to be construed as limited to the foregoing examples or embodiments.

What is claimed is:

1. A method of reducing stresses in vertically arranged, cylindrical metal vessels having a side wall, and top and bottom end walls in which the side and bottom walls are connected by a knuckle radius, said method comprising the steps of:
   (a) forming a heat transfer compartment at the lower end of said vessel by attaching an annular support skirt to said side wall contiguous to said knuckle radius and extending around the periphery of the vessel and downwardly beyond the contour of said bottom end wall, said support skirt having sufficient dimensional stability to support said vessel in a vertical position;
   (b) enclosing the annular space between the interior portion of the skirt and the exterior bottom end wall of the vessel, said heat transfer compartment surrounding said knuckle radius, and
   (c) filling, at least partially, said heat transfer compartment with a heat transfer medium to form a heat transfer sump for transferring heat from the bottom portion of said vessel to the outer portions of said annular heat transfer compartment.

2. The method of claim 1 wherein said heat transfer medium is a liquid.

3. The method of claim 2 wherein said heat transfer medium is circulated through said heat transfer sump.

4. The method of claim 2 wherein the vessel is fabricated of a ferrous material.

5. The method of claim 1 wherein said annular heat transfer compartment is formed by an annular plate connecting said skirt and said bottom end wall of said vessel.

6. The method of claim 1 including the step of transferring heat from the bottom portion of said vessel through said heat transfer medium to the outer portions of said annular heat transfer compartment.

* * * * *